FIG. 5a
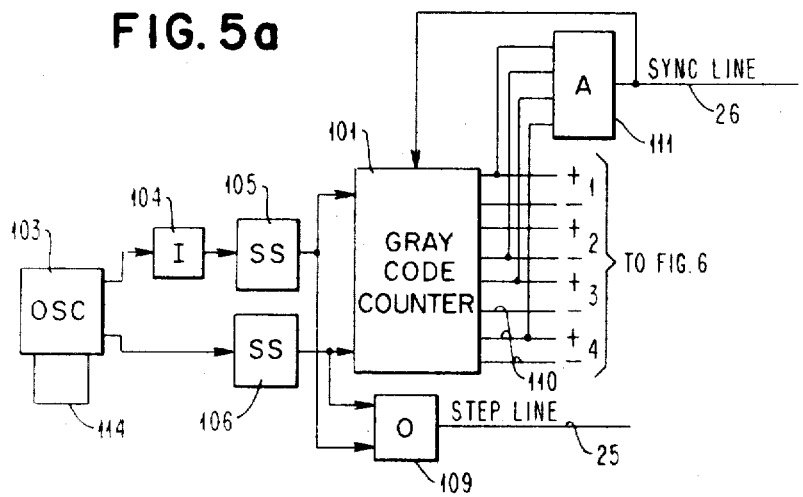
FIG. 5b
| DECIMAL | GRAY CODE | | | |
|---|---|---|---|---|
| | 1 | 2 | 3 | 4 |
| 1 | + | − | − | − |
| 2 | + | + | − | − |
| 3 | − | + | − | − |
| 4 | − | + | + | − |
| 5 | − | − | + | − |
| 6 | − | − | + | + |
| 7 | − | − | − | + |
| 8 | + | − | − | + |
| 9 | + | + | − | + |
| 10 | − | + | − | + |
| 11 | − | + | + | + |
| 12 | + | + | + | + |
| 13 | + | − | + | + |
FIG. 6
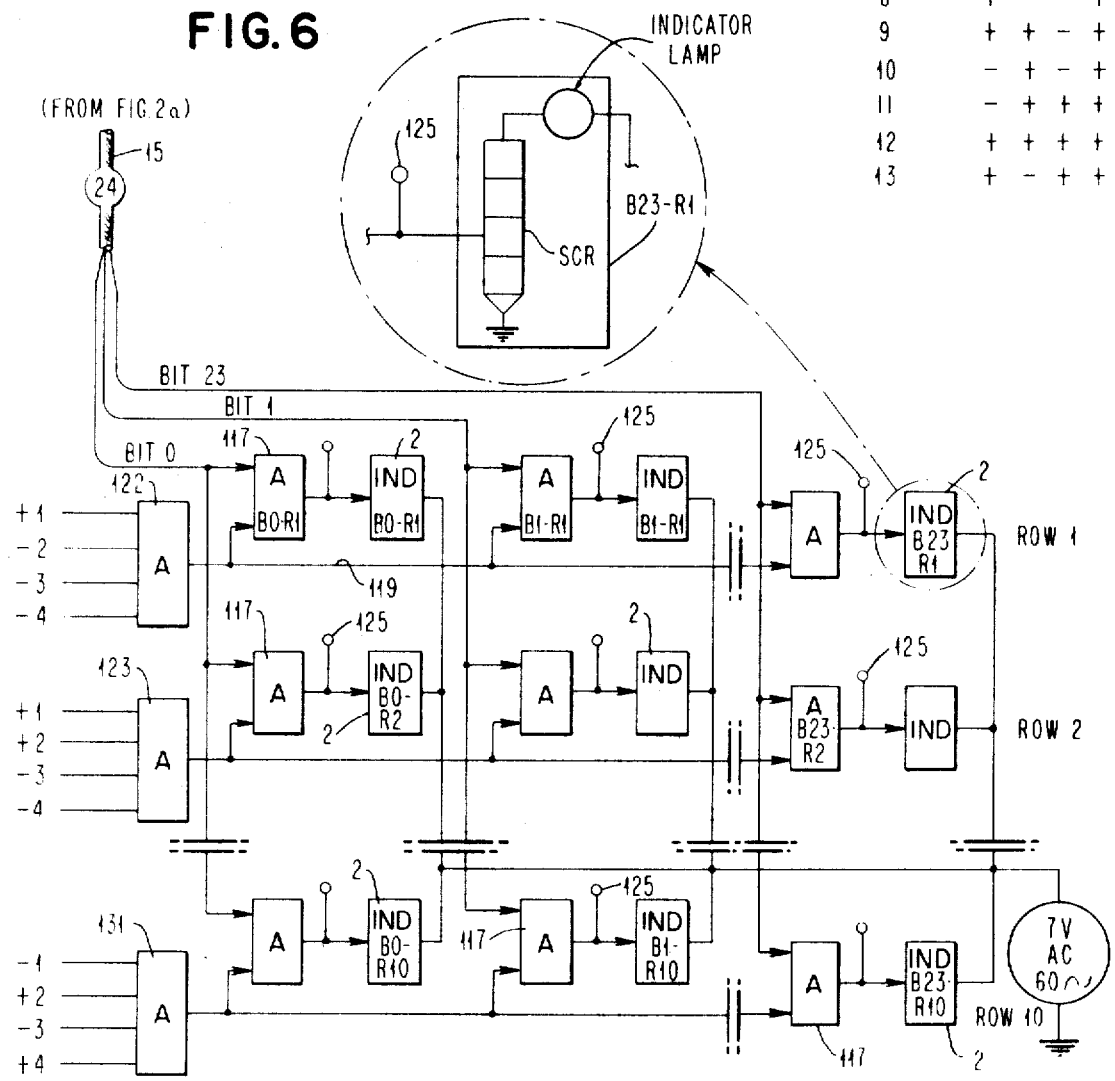

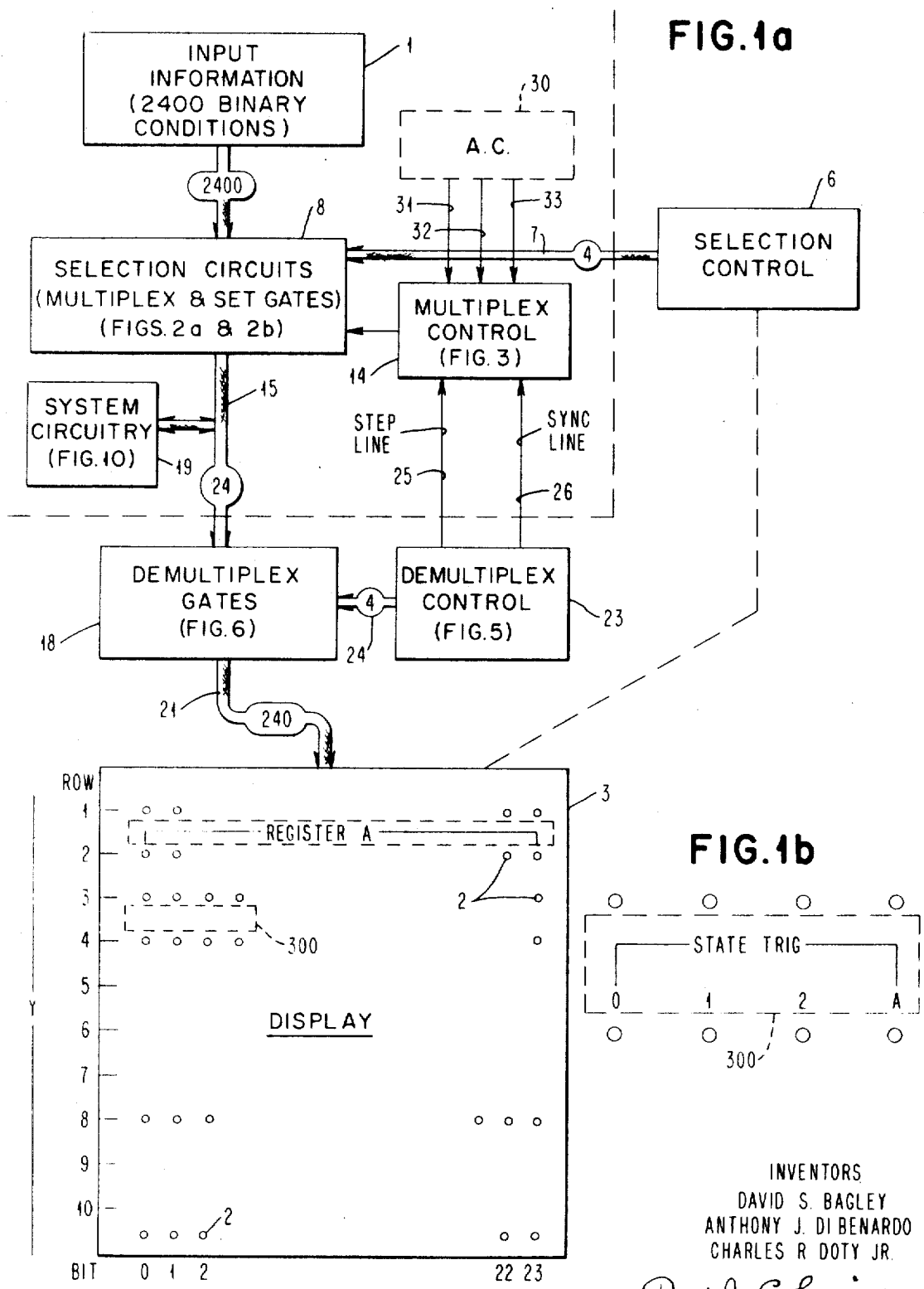

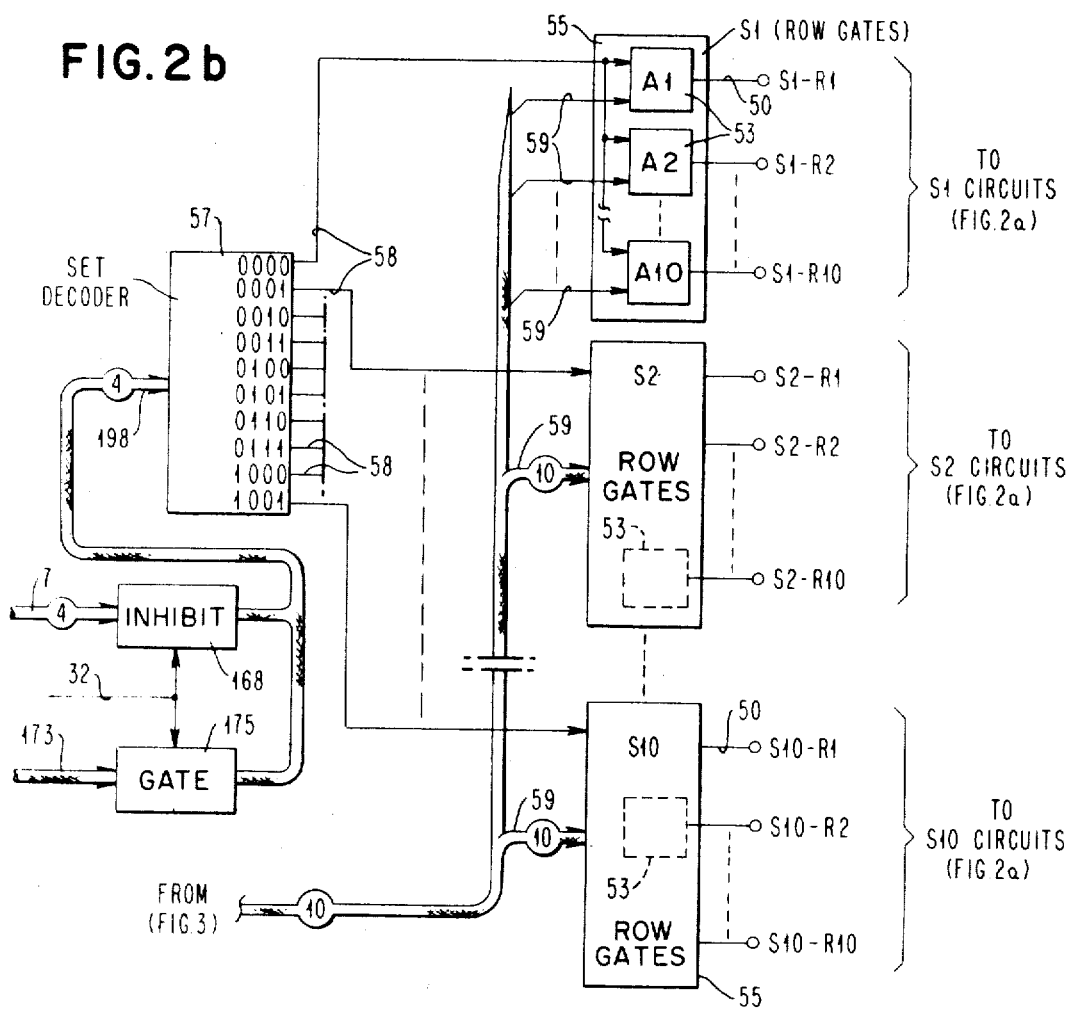
FIG.2b
FIG.3
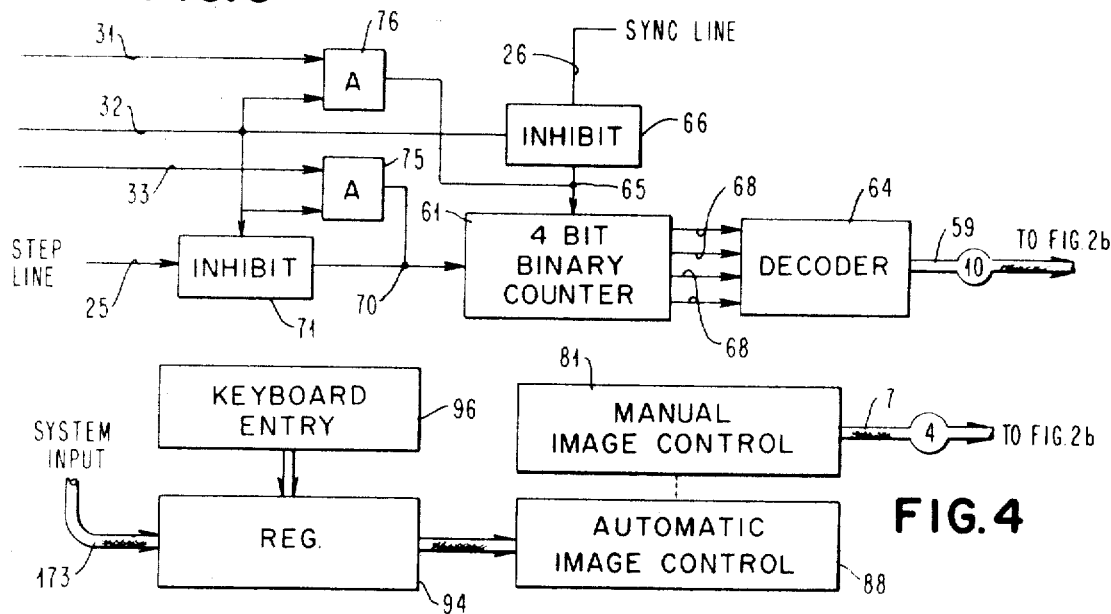
FIG.4

United States Patent Office 3,564,510
Patented Feb. 16, 1971

3,564,510
SELECTION, DISTRIBUTION AND DISPLAY
SYSTEM
David S. Bagley and Anthony J. Di Benardo, Poughkeepsie, and Charles R. Doty, Jr., Wappingers Falls, N.Y., assignors to International Business Machines Corporation, Armonk, N.Y., a corporation of New York
Filed June 20, 1968, Ser. No. 738,482
Int. Cl. G06f 3/14
U.S. Cl. 340—172.5                    19 Claims

ABSTRACT OF THE DISCLOSURE

Disclosed is a selection, distribution and display apparatus for use with one or more data processing systems. The apparatus features, in one embodiment, an optical display having rows of indicators positioned adjacent and in the optical path of an optical screen. A selection control selects an identifying optical image, to be displayed on the screen, from a plurality of images and also selects a set of system conditions to be displayed by the indicators. The indicia of the optical image selected identify the system conditions which are being displayed by the indicators. After selection of an image and thereby the corresponding set of conditions to be displayed, condition signals are multiplexed over a multiplex bus to the display at a relatively slow speed capable of energizing the indicators. Alternatively, the same conditions are selected and gated at fast system speeds and are distributed over the same multiplex bus to other system locations (e.g. system storage). Additionally, stored conditions previously sensed at fast system speeds may be retrieved from other locations and displayed at indicator speeds.

BACKGROUND OF THE INVENTION

The invention relates to the field of data processing and particularly to the field of selection, distribution and display of system information such as status, control, data or other conditions within a system or systems. Where the information is to be displayed for human recognition, the conditions comprising that information are commonly presented to indicators which are capable of being switched on at a comparatively slow speed but which are preferred because they present information in a compact, human-recognizable form. When information is to be processed for future display or other use, however, it is desirable not to waste time and therefore to select and distribute the system conditions at comparatively high system speeds.

In view of the extreme differences in the speed at which a system can handle information and the speed at which indicators can display it, prior art systems have generally segregated the handling of information when it is to be displayed and the handling of that same information when it is to be used for some other system purpose. That prior art segregation of functions has lead to unnecessarily redundant circuitry leading to excessive cost.

Prior art display techniques have generally employed either cathode ray tube (CRT) or indicator display panels to display system conditions. CRT systems, however, are generally too expensive to display large numbers of system conditions, that is, to display the binary state (1 or 0, ON or OFF, UP or DOWN) at bit position within registers or the status of latches. One factor in the cost problem of CRT systems arises because of the necessity of employing expensive circuitry for generating identifying indicia along with the display of the conditions. In view of that cost problem, indicator displays are generally preferred where economy is important.

Prior art indicator displays in one form have employed one indicator for each condition to be displayed so that for one-hundred conditions, one-hundred condition lines from the system to the display and one-hundred indicators to display the conditions are required. While this prior art approach works well when a small number of conditions are to be displayed, it becomes unacceptable for large numbers of conditions. Since many indicators are not needed and cannot be viewed by one operator when other sets of indicators are in use, the prior art use of one condition line and one indicator for each condition is redundant and unduly expensive. Additionally, although indicators (e.g. incandescent lamps, electroluminescent devices, light emitting diodes) are becoming smaller and smaller, difficulties exist in formating indicators in human recognizable patterns, particularly when there is one indicator per condition.

The problem of excessive indicator duplication and the attendant human recognition problem have been overcome somewhat by prior art manual selection techniques which for one-hundred conditions to be displayed have employed ten indicators. In that prior art system, one-hundred condition lines carry the one-hundred conditions to be displayed from the system to the display device and each indicator is associated with a set of ten condition lines from the system. A manual switch for each indicator is employed to select and connect one of the ten condition lines to the indicator at any given time. While this prior art approach has reduced somewhat the number of redundant indicators (by a factor of ten in the example given), it does not reduce the redundant number of condition lines from the system to the display unit. Furthermore, the prior art manual switching techniques for selecting and connecting indicators and condition lines cannot be used by the system for other display, selection and distribution operations at high system speeds.

SUMMARY OF THE INVENTION

The present invention is an apparatus for the selection, distribution and display of information in a data processing system. The problem of presenting system information in a convenient, human-recognizable form without undue duplication of indicators and other circuitry is achieved, in accord with the present invention, through use of an optical projector where the projector's optical screen is interleaved with rows of indicators which are positioned in the screen's optical path. By way of example, 240 indicators are positioned in 10 rows on the projector screen and one optical image identifies the particular set of system conditions displayed by the indicators by projecting optical indicia onto the optical screen adjacent each indicator.

When another optical image is selected, either manually or automatically, different indicia are positioned adjacent the 240 indicators thereby signifying that those indicators are then displaying a different set of system conditions. By way of example, if the input information consists of 2400 system conditions, the display with 240 indicators can depict all 2400 conditions in ten different sets. Each of the ten sets is associated with one of ten optical images which is projected by the displaying device onto the screen.

A set of 240 conditions to be displayed is selected from the 2400 possible conditions by the selection control which also selects the corresponding optical image which contains indicia identifying each of the 240 conditions in the selected set. With the optical image selection and electrical set selection interlocked in this manner, the correct correlation between the optical indicia and the display indicators is assured.

The electrical set selection is achieved when a set signal from the selection control is decoded to select one of ten sets of row gates. Each set of row gates is operable to select 10 rows of input conditions where there are 24 conditions per row. The twenty-four outputs from each of the 100 sets of condition gates are connected in common to the corresponding outputs of each of the other condition gates thereby forming a multiplex bus. For example, each of the twenty-four set-one, row-one conditions occupy a different one of the twenty-four BIT 0 to BIT 23 positions of the bus. Similarly, each of the set-one, row-two conditions occupy a different BIT 0 to BIT 23 position in the bus.

With the above connections, each set of 240 input conditions is time multiplexed a group (i.e., a row) at a time over the twenty-four bit multiplex bus. The 240 multiplex condition signals on the multiplex bus are demultiplexed by demultiplex gates onto 240 indicator lines which are connected to 240 indicators adjacent the display optical screen. The indicators are organized in 10 rows of 24 indicators per row where the rows of indicators correspond to the rows (groups of conditions selected by the heretofore mentioned row gates.

The demultiplex gates are controlled by a demultiplex control which assures synchronization between the multiplex and demultiplex operation by controlling the multiplex control via a step line and a sync line when the input information is to be displayed on the display indicators. The demultiplex control operates at a relatively slow speed so that the condition signals retrieved from the multiplex bus are present sufficiently long to energize the display indicators. In a high speed mode of operation, however, the demultiplex control is inhibited from controlling the multiplex control in favor of a high speed control which operates at relatively fast switching speeds.

With the multiplex and set gates operated at high system speeds, the condition signals on the multiplex bus are read into a system register where they are accumulated into 72 bit groups and distributed to the system via an out bus. The out bus, for example, connects under system control to a system storage unit.

When it is desired to display information from storage or from another system rather than by sensing the system input conditions directly, the system control unit causes the information which is to be displayed to be read into the system register as that register is emptied onto the multiplex bus. Information is gated onto the multiplex bus from the system register under system control at a rate determined by the demultiplex control step line and sync line. The step line and sync line assure that the information on the multiplex bus is in synchronization with the demultiplex gates and that that information will be properly displayed.

It is apparent from the above summary of the invention that a selection, distribution and display apparatus is provided which achieves the objective of economic and efficient selection, distribution and display of information in a data processing system. The further objective of integrating the indicator display apparatus with the high speed distribution circuitry of a data processing system is achieved and provides a high degree of operator flexibility and a great economy of display circuitry. The present invention provides the ability of a first data processing system, including the distribution and display apparatus of the present invention, to monitor the conditions of a second data processing system and display those conditions on the display device associated with the first data processing system. The coordination of the optical image with the electrical indicators achieves the objective of displaying data in a convenient, human-recognizable form while the multiplexing and control of sets of indicators by the optical selection control assures convenient operator operation while providing a minimum of display circuitry. The minimum circuitry allows placement of the display at locations remote from the system being monitored.

The foregoing and other objectives, features and advantages of the invention will be apparent from the following more particular description of the preferred embodiment of the invention as illustrated in the accompanying drawings.

BRIEF DESCRIPTION OF THE DRAWINGS

FIG. 1(a) depicts, in block diagram form, the selection, distribution and display apparatus of the present invention. FIG. 1(b) depicts an expanded view of the ROW 3, ROW 4 portion of FIG. 1(a) display device.

FIG. 2(b) depicts the set decoder which selects a set of row gates which in turn are time multiplexed to select a corresponding row of condition gates for time multiplexing 240 condition signals over the twenty-four bit multiplexing bus of FIG. 2(a).

FIG. 3 depicts the multiplex control of FIG. 1 which sequentially energizes the row gates of FIG. 2(b).

FIG. 4 depicts, in block diagram form, the selection control circuitry of FIG. 1 which operates to select an optical image to be displayed and to select a corresponding set of conditions to be displayed by the indicators.

FIG. 5(a) depicts the demultiplex control circuitry of FIG. 1 which operates to generate relatively slow timing signals for the demultiplex gates and the multiplex control during the display mode of operation. FIG. 5(b) depicts the Gray code representation for the decimal numbers 1–13 generated by the FIG. 5(a) circuitry.

FIG. 6 depicts the demultiplex gates of FIG. 1 which connects the multiplex bus to the display indicators under control of the FIG. 5(a) demultiplex control.

DETAILED DESCRIPTION

General

Figure 2A:
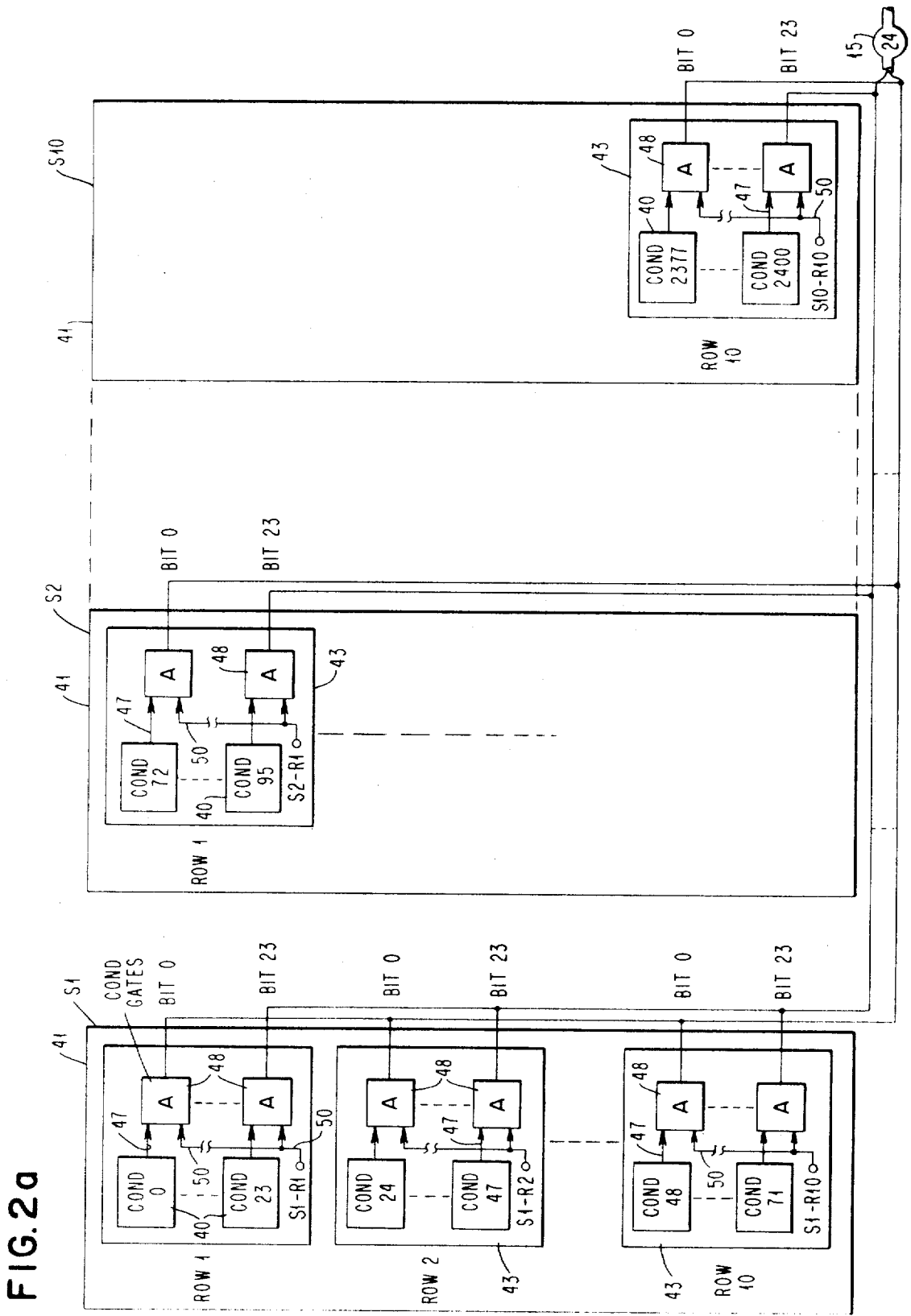
FIG. 2(a) depicts 2400 conditions which comprise the input information to be displayed and depicts the sets of condition gates which are employed to sample and generate condition signals representing the conditions to be displayed.

The present invention relates to a selection, distribution and display apparatus for use with a data processing system. In data processing systems, there are many conditions which an operator might desire to have displayed during normal operation or for maintenance purposes. The number of conditions which might be displayed are, of course, as vast as the number of circuits in the system. For example, the system information may include the condition of each bit in any of the many registers throughout the system, the bit condition of locations in memory, the condition of manual control or I/O equipment, the condition of latches or triggers and many others. In this specification, all of the mentioned and other similar conditions within a system will be defined generically as input information. By way of explanation, a system will be described which can select, distribute and display 2400 bits of input information or, in other words, 2400 conditions. For example, if the contents of a twenty-four bit register are to be displayed, then twenty-four conditions are displayed by twenty-four indicators. If a single trigger representing only one bit of information is to be displayed, then, of course, only one condition is displayed by one indicator.

With reference to FIG. 1, the 2400 conditions to be displayed are collectively represented by the input information represented by block 1. The circuitry collectively represented by block 1 is conventional and may simply include wiring which runs to the register, trigger, or other component having a condition to be sensed. The input conditions of block 1 are displayed by means of indicators 2 in the display device 3. The indicators 2 are preferably lamps or other illumination devices which, by means of the present invention, are turned on when the condition they represent are in the binary 1 state and are off when in the binary 0 state.

The display device 3, in the present example, includes 240 indicators 2 which are grouped in ten rows in the Y direction and twenty-four columns in the X direction. Since there are 2400 conditions and 240 indicators, the 2400 conditions are displayed in ten sets of 240 conditions per set. Since the indicators 2 indicate different conditions depending on the particular set (out of the ten sets) which has been selected, optical images identifying what conditions are being displayed by the indicators are projected adjacent the indicators. For example, a first set of conditions may display in the ROW 2 indicators the contents of Register A (any register in the ssytem). Accordingly, the optical image projected adjacent the ROW 2 indicators contains the indicia "—REGISTER A—." Similarly, that first set may require the first four indicators in ROW 4 to designate the condition of the state triggers (any four triggers in a system) and therefore, that optical image will project above those first four indicators the indicia 300,

"—STATE TRIG—"
  0  1   2  A as shown in more detail in the exploded view of FIG. 1(b). In a similar manner, all of the other 212 indicators depict other input conditions of the first set of conditions and have suitable indicia positioned adjacent thereto.

When a second set of 240 conditions are displayed on the 240 indicators, a second optical image is projected on the screen of display 3 with suitable indicia identifying the second set of conditions being displayed by the indicators. For example, the ROW 2 indicators may display the contents of a different register, e.g. Register B, and therefore the indicia "—REGISTER B—" (not shown) would be included in the optical image associated with set two. Similarly, each additional set of conditions has a corresponding optical image with appropriate identifying indicia.

A particular set from the possible ten sets of input conditions is specified by the selection control 6 which sends a coded signal via the lines 7 to the selection circuit 8. The selection circuit 8 selects 240 of the possible 2400 conditions and generates, when energized, condition signals representative of the binary (that is, 1 or 0) state of the conditions selected in that set. When the 240 conditions have been selected, the multiplex control 14 gates, in ten sequential time slots, groups of condition signals (24 conditions per group) onto the 24-bit multiplex bus 15.

From the multiplex bus 15, the multiplexed condition signals are distributed to either the demultiplex gates 18 associated with the display 3 or to system circuitry 19. System circuitry 19 is discussed in more detail in connection with FIG. 10. System circuitry 19 distributes input information to other points in the system (such as storage for subsequent selection and display) or to points in other systems where it may also be stored, displayed, or otherwise used in that other system. A second system may use the input information of a first system for supervisory, maintenance or other purposes. While input information may be distributed from bus 15 to the system circuitry 19, system circuitry 19 may also distribute input information from a remote system location to bus 15 for display by display 3.

When information on the multiplex bus 15 is to be displayed, the demultiplex gates 18 demultiplex, in ten time frames, twenty-four condition signals per time frame onto the 240 lines 21 which connect to the 240 indicators 2 in display 3.

When input information is to be displayed, the selection circuitry 8 functions to multiplex the condition signals under control of the multiplex control 14. Similarly, demultiplex control 23 controls the gating in demultiplex gates 18 by means of a relatively slow first timing signal which is conveyed to the demultiplex gates via the lines 24, in order to assure synchronous control, that first timing signal is conveyed to the multiplex control 14 via the step line 25 which assures that the demultiplex and multiplex control 23 and 14, respectively, are stepped in synchronism and accordingly the selection circuits 8 and demultiplex gates 18 step in synchronism.

The demultiplex control 23 operates at a substantially slower speed than the very high system speeds in order to economize on the cost of the demultiplex bus, demultiplex gates and other display circuitry. Since the indicators are incapable of turning on and off at high speeds and furthermore since rapidly changing (nanosecond speeds) indicators would not have significant meaning to an operator, there is no justification for employing the more expensive circuitry which would be required if the demultiplex control 23 were operated at nanosecond speeds. Additionally, the input conditions which are displayed are generally in a static (temporarily nonchanging) condition so that high speed sampling has no advantage over the more economical slower speed.

When input information is to be distributed from input information block 1 to the system circuitry 19, however, multiplex control 14 is controlled by the auxiliary control 30 which operates at substantially higher speeds than the demultiplex control 23. Control 23 is constrained to operate at a relatively slow speed suitable for controlling display 3. The system circuitry 19, however, has no slow speed constraints and, accordingly, the multiplex control 14 may be operated at very fast system speeds so as not to waste time.

SPECIFIC CIRCUITRY

FIG. 2(a) depicts a portion of the selection circuits 8 of FIG. 1 in more detail. The 2400 conditions 40 are organized for convenience, in accordance with the present invention, in ten sets 41 designated as S1, S2, . . . S10. Each set 41 is similarly organized for convenience, in accord with the present invention, in ten groups 43 of twenty-four conditions 40 per group. Each group in a set is given a ROW designation and for the purposes of this explanation ROW is included within the generic term "group." Accordingly, each of the sets 41 includes the group designations ROW 1, ROW 2 . . . ROW 10. Each of the conditions 40, of course, correspond to 1 bit of input information and reflects, for example, the state of a register stage, trigger, latch or other element within the system.

Each of the conditions 40 forms one input 47 to a corresponding condition gate 48, the latter of which are conventional two-way AND circuits. Each gate 48 has its output connected to one of the twenty-four BIT positions on the 24-bit multiplex bus 15. For example, COND 0, COND 24, COND 48 and COND 2377 are connected through their corresponding gates 48 to the BIT 0 position of the 24-bit bus 15. Similarly, COND 1, COND 25, COND 73, COND 97 and COND 2378 are connected through their corresponding gates 48 to the BIT 1 position of bus 15. All of the other conditions 40 are connected to the appropriate BIT position of bus 15.

Since only one ROW (that is group) of conditions is connected to the multiplex bus 15 at any given time, the particular gates which are selected are controlled by the second inputs 50 to the gates 48. The inputs 50 are derived from the ROW gates 53 which form another part of the selection circuitry and which are described in more detail in connection with FIG. 2(b). When the ROW 1 gates 48 of set S1 are to be gated to the multiplex bus 15, the ROW gate line S1–R1 causes gates 48 via inputs 50 to gate condition signals onto the multiplex bus 15. For example, if COND 0 is in the binary 1 state, the associated gate 48 will be satisfied by inputs on 47 and 50 causing a binary 1 condition signal to appear on the BIT 0 line of the 24-bit bus 15. Similarly, if COND 23 is in the binary 0 state, the associated gate 48 will not be satisfied thereby causing a binary 0 to appear in the BIT 23 position of the 24-bit bus 15. Similarly, all of the other conditions COND 1, COND 2 . . . COND 22 (not shown) will be gated to the corresponding BIT 1, BIT 2 . . . BIT 22 (not shown) positions of the bus 15.

The ROW 2 conditions 40 have condition signals gated onto the bus 15 when the set 1 ROW gate line S1–R2 is energized. Similarly, ROW 3 (not shown) is gated to the bus 15 when the S1–R3 line (not shown) of FIG. 2(b) is energized. All of the groups in set 1 are energized in sequence until the S1–R10 signal energizes the gates in ROW 10 of set 1. After all ten rows of set 1 have been energized, set 1 may be again scanned gating ROW 1 through ROW 10 in sequence. Alternatively, a different set such as S2 may be gated, a group (ROW) at a time onto the multiplex bus 15 in accord with the operation of FIG. 2(b).

FIG. 2(b) depicts part of the selection circuitry 8 of FIG. 1. The FIG. 2(b) circuitry is responsive to the selection control 6 and multiplex control 14 of FIG. 1 for selecting a specified set of the conditions in FIG. 2(a) and multiplexing that specified set a group at a time (that is, a ROW at a time) onto the bus 15 of FIG. 2(a). The FIG. 2(b) selection circuitry includes one-hundred row gates 53 which are organized for convenience, in accord with the present invention, in ten banks 55 of ten gates 53 per bank. Each bank 55 corresponds with a different set of 240 conditions and the banks 55 are correspondingly labeled S1, S2 . . . S10. The set decoder 57 is responsive to the selection control 6 of FIG. 1 (described in more detail hereinafter in connection with FIGS. 6 and 9). Set decoder 57 is a conventional decoder which operates to decode the binary code on input line 7 and 198 from the selection control 6 to select one of the ten decoder output lines 58. The selected output line 58 selects one of the ten row gate banks S1 through S10.

The selected output 58 is one input to all the row gates 53 in the selected set. The row gate 53 can be, for example, conventional AND circuits. Each row gate, besides a selecting input from the decoder 57, receives a different one of ten inputs 59 from the multiplex control 14 of FIG. 1 (shown in more detail in FIG. 5). The ten inputs from the multiplex control 14 are energized in sequence so that if the S1 row gates are selected by decoder 57, the gates 53 are energized in sequence from A1 through A10. Correspondingly, the outputs 50 from the row gates of S1 are energized in the sequence S1–R1, S1–R2 . . . S1–R10. If the row gates S2 are selected by decoder 57, then the inputs 59 (not shown) to the S2 row gates energize S2–R1, S2–R2, and so on to S2–R10. Similarly, each of the other sets of row gates S3 (not shown) to S10, when selected by decoder 57 in response to a coded signal from selection control 6, have the output lines 50 energized in sequence by the inputs 59.

FIG. 3 depicts the multiplex control 14 of FIG. 1 in more detail. The multiplex control 14 includes a conventional 4 bit binary counter 61. Counter 61 is stepped through at least ten positions and is then reset by sync input 65 which is connected to sync line 25 from the demultiplex control 23 of FIG. 1 when the input information is to be displayed. During the display mode of operation, the conventional inhibit circuit 66 is non-activated. The four outputs from the stages of the counter 61 are decoded in conventional decoder 64 to energize one of the 10 output lines 59 which line in turn selects one of ten row gates 53 in the selected set of row gates. As the binary counter 61 is stepped through ten counts, the output lines 59 are each energized in sequence so as to sequentially energize the row gates in the selected set.

When in the display mode of operation, counter 61 is stepped through the counts by input 70 which is connected to the step line 25 from demultiplex control 23. When the input information is to be displayed, inhibit 71 is non-energized and may be ignored. Step line 25 represents or contains a first timing-signal input for controlling the slow speed operation of the multiplex control 14 which includes the counter 61 and which, therefore, controls the slow speed operation of the selection circuitry 8.

When it is desired to operate the selection circuits 8 of FIG. 1 at a relatively high speed, a second timing-signal input 33 is connected to the counter 61 input terminal 70 via gate 75. Gate 75 is satisfied by a signal on the gate and inhibit line 32 from the alternate control 30. The signal on line 32 also functions to energize inhibit circuits 66 and 71 thereby preventing operation of the step line 25 and sync line 26 inputs from demultiplex control 23. Additionally, the gate line 32 satisfies AND 76 allowing sync line 31 from the auxiliary control 30 to reset the counter 61 via the sync line input 65.

FIG. 4 depicts a further schematic of the selection control 6 of FIG. 1. The selection control 6 includes the manual image control 81 which through its operation generates a coded binary signal for specifying one of the sets of conditions, previously discussed in connection with FIG. 2(a), as a specified set to be selected by the selection circuits 8 as further shown in FIGS. 2(a) and 2(b). The details of the manual image control circuitry 81 are shown in connection with FIG. 9. Briefly with reference to FIG. 9, the manual image control 81 operates to specify one of the sets of conditions as a specified set to be selected by generating a coded signal on the line 7 by means of the shaft position switches 83. The switches 83 are turned on or off in dependence upon the shaft mounted coded disks 84. The disks 84 are notched in a coded fashion so as to indicate in the well known manner the respective position of the shafts 86 and 87 to which they are attached. The rotation of shafts 86 and 87 causes the horizontal and vertical movement of the microfilm holder 90.

Although the manual image control 81 may be hand operated by turning the knobs 93, an alternate arrangement employs stepping motors connected to the shafts 86 and 87 for automatic positioning of the holder 90 and the attendant energization of switches 83 so as to automatically specify one of the ten sets of conditions via the signal generated on lines 7. Such stepping motors (included in automatic image control 88 of FIG. 4) are conventional in the prior art and are controlled in a conventional manner. For example, as indicated in FIG. 4, a 4-bit code placed in register 94 is used to position the shafts of motors (not shown) in control 88. The register 94 can be loaded, of course, from other system points through input 173 or by a keyboard entry 96. Where stepping motors are employed, use of a keyboard entry 96 to load register 94 avoids the need for the manual control knobs 93.

FIG. 5(a) depicts the demultiplex control 23 of FIG. 1. The demultiplex control of FIG. 5(a) consists of a conventional Gray code counter 101 which is driven by a conventional oscillator 103 (approximately 20 kHz.) through conventional invert and single shots 104 and 105 respectively. The invert and single shot 104 and 105 increment the counter 101 one step for each positive going pulse from the oscillator 103. Similarly, the single shot 106 increments counter 101 one step for each negative going pulse of the oscillator 103. OR 109 combines the outputs of single shots 105 and 106 and thereby induces a stepping pulse on step line 25 about once each twenty-five microseconds which connects to the multiplex control 14 of FIG. 1 as shown in more detail in FIG. 3. Step line 25, of course, has a step pulse for stepping the four bit binary counter 61 of FIGS. 3 in synchronism with the stepping of the counter 101 of FIG. 5(a).

Counter 101 consists of four stages and has a Gray code output on four pairs of positive and negative output lines 110. FIG. 5(b) depicts the Gray code positive and negative values on the four sets of output lines which correspond to the decimal numbers from 1 through 13. The Gray code counter counts sequentially from decimal 1 to 13 by generating the indicated positive and negative values on the indicated four pairs of lines.

Four-way AND circuits 111 is connected to the positive lines for the first, third and fourth stages of the counter and to the negative lines of the second stage in order to develop a reset pulse during the thirteenth count of counter 101. The reset pulse on the sync line 26 is fed back to reset the counter 101 and is supplied to the multiplex control 14 of FIG. 1 as shown in more detail in connection with FIG. 3. When the count 13 is reached, both the counter 101 and the 4-bit binary counter 61 of FIG. 3 are reset when the apparatus of the present invention is in the display mode of operation.

FIG. 6 depicts the demultiplex gates 18 of FIG. 1. The indicators 2 correspond to the indicators in the display 3 of FIG. 1. The indicators 2 of FIG. 6 are organized in rows and columns and the group of indicators in ROW 1 are designated as B0–R1, B1–R1 . . . B23–R1. Similarly, the indicators in the columns, for example a column of indicators connected to the BIT 1 line of bus 15 are designated as B1–R1, B1–R2 . . . B1–R10. Associated with each indicator is a demultiplex gate 117. The demultiplex gates 117 are organized into groups which are identical with the ROW designations previously used in this specification. The gates 117 are given the same designation as the indicators 2, for example, B0–R1, B23–R2, etc. All of the R1 gates are grouped together by means of a common connection 19 to the decimal 1 AND decoder 122. AND decoder 122 as a +1, −2, −3, and −4 inputs from the counter outputs 110 of FIG. 5(a) Those connections, in accord with the chart of FIG. 5(b), correspond to decimal 1 so that the ROW 1 indicators are selected by the ROW 1 gates when the counter 101 of FIG. 5(a) is in the decimal 1 state. Each of the gates for ROW 1 is connected with a different one of the lines on the 24-bit multiplex bus 15 previously described in connection with FIG. 2(a). More particularly, all B0 gates are connected to BIT 0 on bus 15, all of the B1 gates are connected to the BIT 1 line on bus 15 and so on. As the counter 101 counts from decimal 1 through decimal 10 and generates the appropriate positive and negative outputs on lines 110, the demultiplex gates connect the indicators to the multiplex bus 15 a ROW at a time. The ROW of indicators connected correspond to the group (ROW) of conditions which are connected to the multiplex side of the bus 15 by the circuitry of FIG. 2(a).

While the row decoder 122 decoded the decimal 1 state of counter 101, decoder 123 decodes the decimal 2 state of counter 101 and so on until decoder 131 decodes the tenth decimal state of the counter. Although the counter is indicated as counting beyond the tenth state through eleven, twelve and thirteen, neither the multiplex control 14 nor the demultiplex control 123 are operative to select any circuitry during the eleventh, twelfth and thirteenth counts but become inoperative after the tenth count until reset by the thirteenth. The three extra counts are superfluous for the present invention, but are employed when the counter simultaneously controls other circuitry requiring a higher count.

A detail view of the indicators 2 is shown in FIG. 6 in connection with the expanded view of indicator B23–R1. As indicated in that view, the indicators 2, in a preferred embodiment, include an SCR having its emitter tied to ground and its collector in series with an indicator lamp and a 7 volt, 60 cycle, AC source. The gate of the SCR is connected to terminal 125 coming from the AND gate. The SCR's included in the indicator circuits function to both latch the indicators ON when appropriate signals are received from the multiplex bus BIT lines and also to provide sufficient power to drive the indicators.

Figure 7:
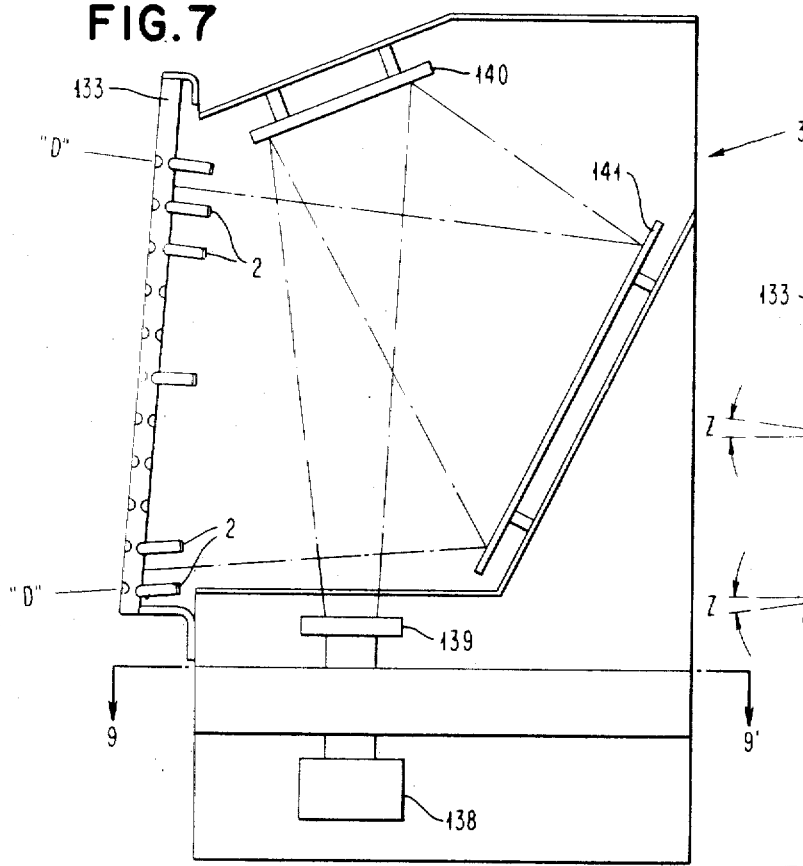
FIG. 7 depicts a side view of the display device of FIG. 1.

FIG. 7 depicts a sectional side view of the display 3 of FIG. 1. The display 3 includes an optically transparent screen 133 for viewing optical images projected from a microfilm holder 135, the latter of which is described in more detail in connection with FIG. 9. The microfilm in the holder 135 is projected by light source 138 through the lens system 139 over the mirrors 140 and 141 to the screen 133. Indicators 2 are positioned adjacent the optical screen 133 and in the optical path of the optical image projected from the mirror 141. The distance $d$ between each of the rows of indicators 2 is sufficiently large for optical indicia to be positioned so as to thereby identify the conditions which are being displayed by the indicators 2 as previously discussed in connection with FIG. 1(a) and particularly FIG. 1(b).

Figure 8:
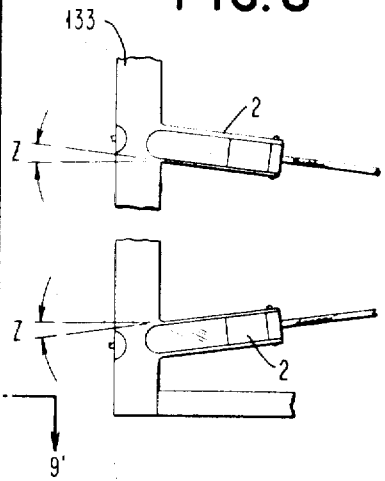
FIG. 8 depicts a detailed view of the indicator mounting on the inside of the optical screen for the FIG. 7 and FIG. 1 display device.

FIG. 8 depicts a detailed view of the mounting of the indicators 2 adjacent the screen 133 such that the angles "Z" at which the indicators extend from the screen 133 are substantially the same as the angle at which the light from mirror 141 impinges upon that screen. The mating of the angle of the indicators on the screen 133 with the angle at which the optical image is locally projected assures that a minimum of obstruction will be caused by the indicators being placed within the optical path of the optical image.

Figure 9:
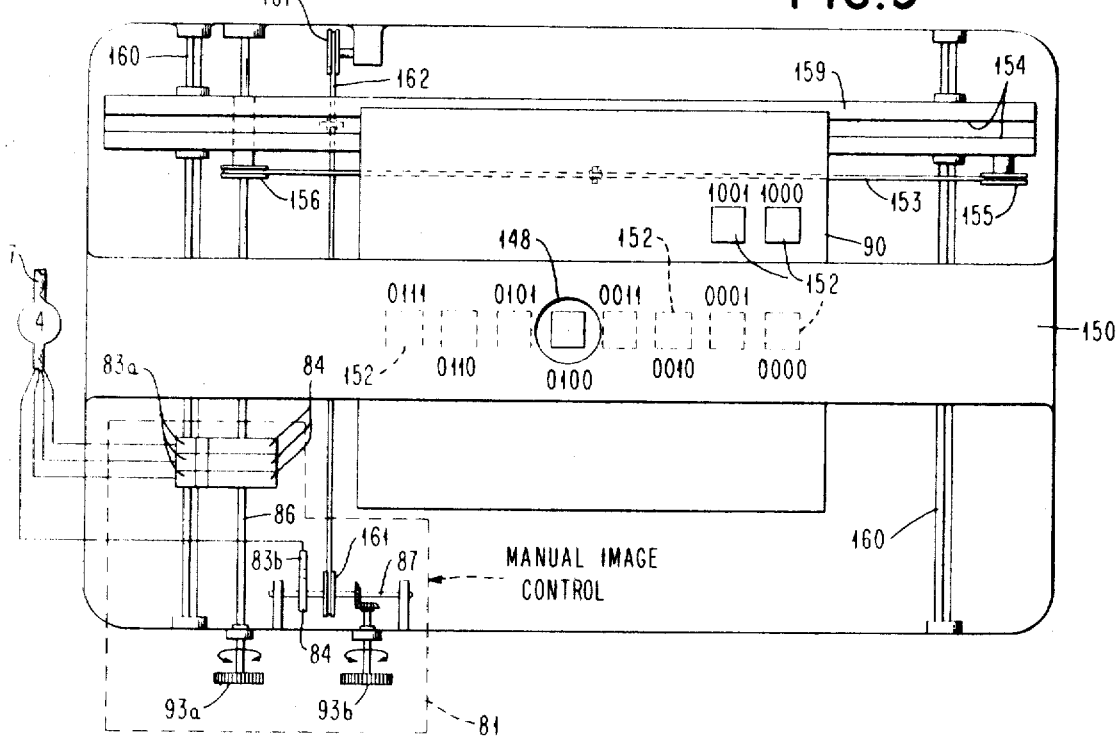
FIG. 9 depicts a top view of a cutaway portion of the FIG. 7 display which portion depicts the details of the optical image selection apparatus.

FIG. 9 depicts a top sectional view of the microfilm positioning controls of display 3 taken along the section 9–9' of the FIG. 7 view of the display. The lens system 139 is positioned above a fixed hole 148 in a horizontal member 150. Beneath the fixed opening 148 and fixed member 150 is a horizontal and vertically movable microfilm holder 90 containing ten microfilms containing the ten optical images having indicia for identifying the 2400 conditions which are displayed in accordance with the present invention. The microfilm holder 90 is slidably mounted on the tracks 154. Holder 90 is moved horizontally along the tracks 154 by means of the wire 153 fixedly attached to holder 90 and mounted around pulleys 155 and 156. Pulleys 155 and 156 are moved by rotation of shaft 86 which, in turn, is rotated by knob 93(a) under manual control or by means of a stepping motor (not shown) in order to horizontally position the holder 90 under the opening 148 in the lens system 139. Tracks 154 are fixedly mounted on the carriage 159 which carriage is slidably mounted on tracks 160. Carriage 159 is moved in the vertical direction by means of wire 162 attached to the carriage 159 and mounted over pulleys 161. Rotation of the shaft 87 by means of the knob 93(b) or by means of a stepping motor (not shown) causes pulleys 161 to rotate thereby moving the carriage and the microfilm holder in the vertical direction. Pulley 156 is slidably mounted on the shaft 86 but as previously indicated is constrained to rotate with shaft 86.

As previously discussed in connection with FIG. 4, disks 84 cause a coded energization of the switches 83 so that wires 7 have a binary representation of which microfilm 152 is positioned beneath the opening 148 and lens 139.

Figure 10:
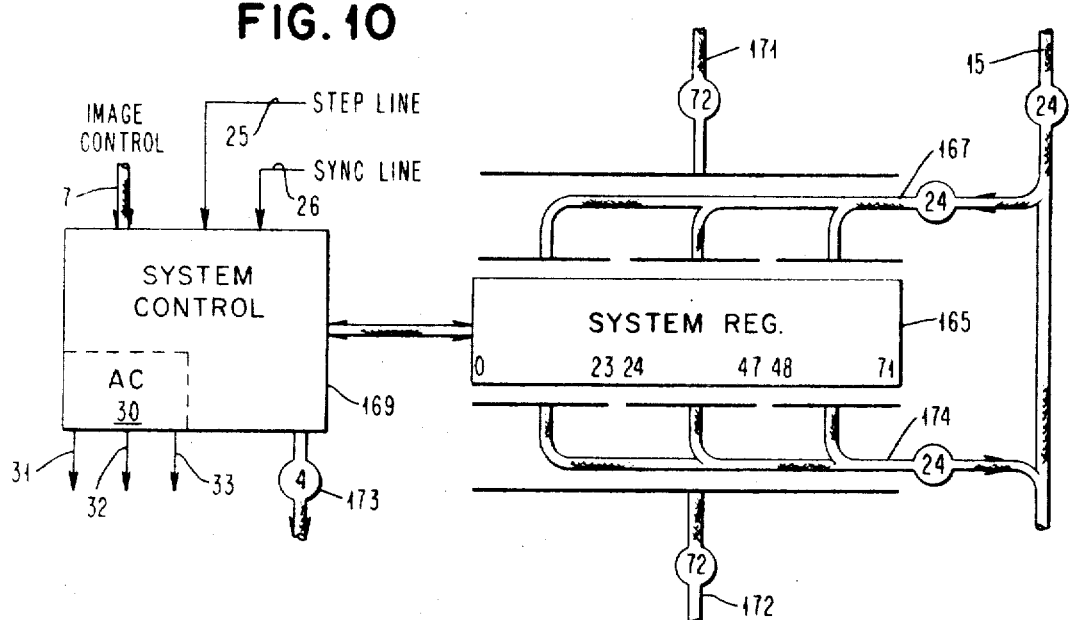
FIG. 10 depicts the system circuitry by which input information may be distributed from the multiplex bus to some external point in the system through a system register or alternatively by which information to be displayed may be retrieved from some external source and distributed to the indicators of the display device.

FIG. 10 depicts the system circuitry 19 of FIG. 1 in more detail. The multiplex bus 15 of FIG. 1 connects through the demultiplex gates 18 to the indicators 2 during the display mode of operation. However, when it is desired to distribute input information to the system circuitry 19, bus 15 is connected to the system register 165. With reference to FIG. 10, systems register 165 is indicated as being 72 bits wide while the bus 15 is only 24 bits wide. The three horizontal lines immediately above the system register 165 connecting to the 24-bit input bus 167 are the conventional indication (and therefore not shown in detail) for gates which are under control of the system control 169. Those input gates, as well as the output gates (indicated by horizontal gates beneath the register) allow the system register to have any one of its three 24-bit sections connected to the multiplex bus 15 under control of system control 169. Since the gating in and out of registers is well known in the data processing field, no further description of the gating and gating control is deemed warranted. Any of the well known sequential logic or microprogram control techniques may be employed as is desired.

System register 165 also includes a 72-bit input bus 171 and a 72-bit output bus 172 for communication with other parts of a data processing system (not shown). The 72 bit bus may, for example, connect to main storage, to local storage, or to working registers in the system. By means of the bus 171, information may be retrieved from main storage under control of the system control 169 and gated to the multiplex bus 15 via the bus 174 with the appropriate gating of control 169. If information in the systems register 165 is to be displayed on display device 3 of FIG. 1, then the information gated over the bus 174 and onto the multiplex bus 15 must be in synchronism with the demultiplex gates 18 as controlled by demultiplex control 23 and further described in connection with FIG. 5(a) and FIG. 6. When information is gated from the system register 165 to be displayed, a step line 25 and sync line 26 from demultiplex control 23, as described in FIG. 5(a), are connected to the system control 169. Similarly, the image control lines 7 from selection control 6 of FIG. 1 are sensed by the control 169 of FIG. 10.

Although the details of a system control 169 are well known and therefore no special detail is deemed warranted, a few of its features will be pointed out. In one mode of operation, the system control which may include a computer program and/or a computer microprogram allocates 2400 main storage locations for the 2400 input conditions to be sensed. The 10 sets of conditions S1 . . . S10 of 240 per set are assigned addresses sequentially in memory. The address of the first location, that is, for COND 0 may be fixed or stored in an address register in the system control 169. The initial address is incremented by 240 times the set number as indicated by the image control input on line 7. The addressing and read out of the main storage is under control of system control 169 in the conventional manner, but the gating out to the multiplex bus 15 from the register 165 is accomplished only when a signal is received on the step line 25. Sync line 26 is sensed by control 169 in order to assure that the system control is in synchronization with the multiplex control 23.

Figure 11:
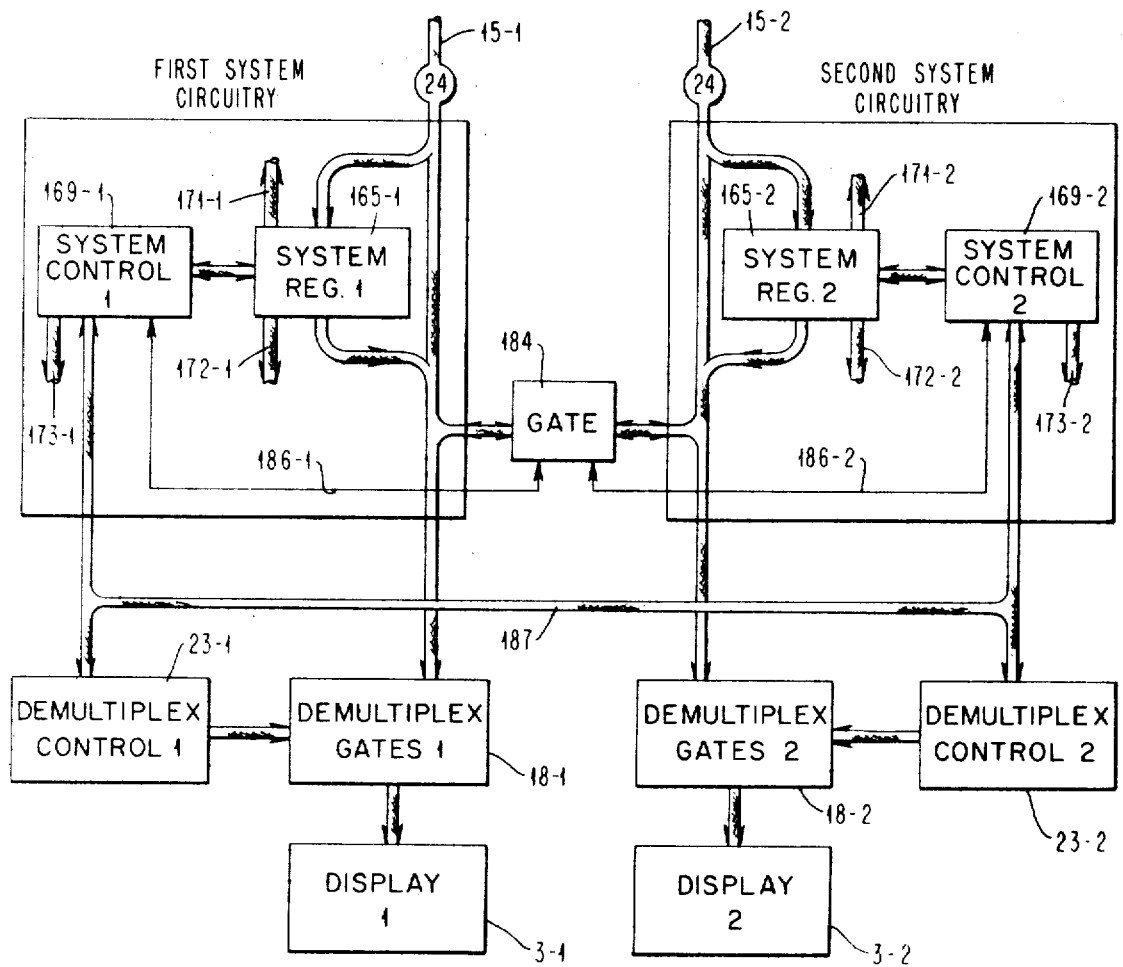
FIG. 11 depicts a duplex system where the information from a first system may be displayed on a second system's display.

FIG. 11 depicts a duplex organization of two selection, distribution and display systems similar to that of FIG. 1. In order to simplify the description of the FIG. 11 systems, the FIG. 1–FIG. 10 numbering has been preserved merely adding a −1 subscript for FIG. 11 circuitry associated with the first system and adding a −2 subscript for circuitry associated with the second system. For example, the displays analogous to the display designated as 3 in FIG. 1 have been designated as 3–1 and 3–2 in FIG. 11.

DISPLAY MODE OPERATION

In the manual mode of operation, an operator will first select one of the ten sets of 240 conditions which he desires to view. To do this the operator, with reference to FIG. 9, manually turns control knobs 93 thereby positioning one of the ten optical images 152 under the opening 148 to align the selected image with the light source 138 and lens system 139, the latter two of which are shown in FIG. 7. The ten microfilms 152 each have a coded binary address running from 0000 through 1001 as indicated in FIG. 9. The film holder 90 is shown with the fifth or 0100 microfilm positioned under the lens and opening 148. By turning the knob 93(a), the shaft 86 is rotated so that any of microfilms from 0000 through 0111 may be selected by moving the carriage 90 in the horizontal direction. For example, the second microfilm, that is, 0001, could readily be positioned under the opening 148 by rotating shaft 86 and thereby horizontally moving holder 90. With the 0001 microfilmed under the opening 148, the switches 83(a) would render an output of —001 on their 3 output lines to output bus 7. The fourth or higher order bit position is generated by the switch 82(b) which is set in the 1 or 0 position by rotation of the knob 93(b). Switch 82(b) is in the 1 position when the microfilms 1001 or 1000 are positioned under the member 150 and selectably movable under opening 148. With the 0001 microfilm under the opening 148, the higher order bit would be 0 so that the four output lines to bus 7 would contain the code 0001. With the 0001 microfilm positioned under opening 148, the operator sees on the FIG. 1 display face the second optical image having optical indicia corresponding to and identifying the second set of 240 conditions.

With reference to FIG. 2(b), selection of the second optical image by the operator automatically causes set decoder 57 to select the 0001 output 58 which in turn selects the S2 ROW gates 55 via an input to each of the ten ANDS 53. With the S2 ROW gates selected in that manner, those gates are ready for the multiplex signals via inputs 59 from the multiplex control of FIG. 3.

With reference to the multiplex control of FIG. 3 and assuming that the display mode of operation has not been inhibited by a system input via the lines 31, 32, and 33, step line input 25 causes the binary counter 61 to count at a relatively slow first timing-signal rate in synchronism with the counter 101 of the demultiplex control of FIG. 5(a). The output of counter 61 is decoded in decoder 64 which selects, one at a time, the ROW gates 53 of S2 thereby sequentially energizing, in FIG. 2(b), the outputs 50 from S2–R1 through S2–R10.

With reference to FIG. 2(a), the S2 outputs 50 energize the S2 condition gates 41 a group at a time starting with the twenty-four gates of ROW 1 (energized by S2–R1) continuing through ROW 10 (energized by S2–R10). The twenty-four condition gates for each ROW switch twenty-four condition signals onto the 24-bit multiplex bus 15 in ten time frames. In the first time frame, for example, condition signals for COND 72 through COND 95 are gated onto the bus 15.

With reference to FIG. 6, the ten groups of condition signals in the ten time frames on the multiplex bus 15 are demultiplexed a group at a time thereby illuminating the indicators 2 appearing adjacent the screen in the display 3 of FIG. 1 a ROW at a time. The demultiplexing is under control of the demultiplex control of FIG. 5(a) which includes the counter 101 which has a coded output counting from decimal 1 at least through decimal 10. The coded outputs 110 of counter 101 are decoded in the FIG. 6 decoders to select indicators 2 a group at a time. Decoder 122 detects the decimal 1 condition and selects the ROW 1 gates B0–R1 through B23–R1 thereby energizing the corresponding indicators 2 of ROW 1 for which there is a corresponding 1 signal on the multiplex bus 15. During the decimal 2 or second time frame, the ROW 2 indicators are selected by decoder 123. Similarly, each of the ROWS of indicators are selected until finally the ROW 10 indicators are selected by decoder 131.

In a preferred mode of operation, the indicators 2 include latches as previously discussed in connection with a typical indicator B23–R1 of FIG. 6. In operation, the collector of each SCR latch is connected through the indicator lamp to a 7-volt, 60-cycle, AC source. During the negative half cycle of that 60-cycle source, all SCR's are turned off and remain off until the positive half cycle. During the positive half cycle, an SCR is turned on (thereby turning on its indicator lamp) if a signal appears on the gate input at terminal 125. Once having been turned on, an SCR and its associated indicator lamp remains on until the negative half cycle is reached.

The desirability of employing latches with the indicator lamps exists because each ROW of indicators (and therefore each indicator) cannot be energized more than 1/10 (because there are ten ROW'S) of the time due to the demultiplexing. A new ROW is gated onto the bus 15 every 25 microseconds so a minimum of 250 microseconds is required for one scan cycle. A scan cycle, of course, is the time required for the FIG. 5(a) counter to count from decimal 1 to decimal 10 (ignoring the decimal 11 through 13 count which may be eliminated). Such an illumination period (10% duty cycle) is unsatisfactory for most indicators because the power deliverable to the indicators is insufficient to illuminate them brightly as desired.

Since the SCR's are controlled by a 60-cycle signal, they are all off for approximately 8.3 milliseconds (during the negative half cycle) and may be gated on anytime during the 8.3 milliseconds of positive half cycle. Since one scan cycle is approximately 250 microseconds, approximately sixteen full scan cycle (all ten ROW'S are scanned in each scan cycle) occur during each 8.3 milliseconds of positive half cycle. Although any particular SCR might not be set during the first of the sixteen scan cycles due to the transitional nature of the initial part of the 8.3 millisecond positive half cycle, such SCR will be gated on very early in that positive half cycle by the second or subsequent scan. Accordingly, the duty cycle for the indicators has been converted from 10% without latches to approximately 50% with the latches. The 50% duty cycle, of course, is derived from the 60-cycle signal which allows the SCR's to be on during the positive half cycle which is present 50% of the time. If it is desired to increase the duty cycle to even greater than 50%, then a non-symmetrical 60-cycle source with a higher percentage of on time than off may be employed.

After ROW 10 indicators have been energized, the demultiplex control of FIG. 5(a) resets counter 101 and counter 61 of FIG. 3 during the decimal 1 count via sync line 26 and the selection, distribution and display of the S2 conditions is again carried out in the manner of operation described.

If at any time an operator desires to select, distribute and display any other set of conditions, he merely selects via the control knobs 93 the desired set and the operation is again carried out as previously described. Alternatively, the system circuitry of FIG. 10 may initiate a system mode of operation and inhibit the display mode of operation.

SYSTEM MODE OPERATIONS

With reference to FIG. 10, the system mode of operation is initiated by system control 169 via signals on output lines 31, 32 and 33 from auxiliary control 30. Those signals are received by the multiplex control 14 (shown in FIG. 3). The output signal on 32 inhibits the display mode of operation through inhibit circuits 66 and 71 allowing the binary counter 61 to be stepped at a high system speed by a second timing signal on the line 33 and to be reset by a system reset signal on line 31. With counter 61 stepping at a high system speed, decoder 64 conveys the multiplex signals to the ROW gates of FIG. 2(b) as previously described. In this system mode of operation, the particular set of ROW gates which is selected is controlled by a signal from the system control of FIG. 10 over the bus 173 which connects to the input bus 178 when gate 175 is energized by the inhibit and gate line 32. Output 7 from the selection control 6 is inhibited by inhibit circuit 168. System control 169 of FIG. 10 may select any set of the ten sets (or all of them in sequence) via its output 173 to the set decoders 57 of FIG. 2(b). In this system mode of operation, all of the 2400 conditions may be selected and distributed, through the system register 165 of FIG. 10, to any desired location in the system or to a remote system.

When it is desired to display information from the system register 165 on display 3 of FIG. 1, the demultiplex control of FIG. 5(a) via the line 7, 25, and 26 input signals to the system control 169 cause (in cooperation with the system control) the desired set of conditions to be gated over the bus 174 to the multiplexed bus 15. Thereafter, the signals on bus 15 are demultiplexed to control the indicators of FIG. 1 in the manner previously described. In this system display mode of operation, the system register 165 is loaded in a well known manner under the control of system control 169 at a much faster rate than information can be read out over bus 174 so that the information required by the demultiplexed gates 18 of FIG. 1 is always available when requested by the step line 25 input to the system control 169.

ALTERNATE EMBODIMENTS

Although a number of alternate embodiments have previously been described, the operation of those and other embodiments will be further clarified by the following descriptions:

With reference to FIG. 4, an automatic display mode of operation occurs when register 94 delivers a control signal to the automatic image control 88 for positioning the shafts 86 and 87 and thereby the microfilm holder 90 of FIG. 9. In one preferred mode of operation, the register 94 is loaded by the system control 169 of FIG. 10 via the bus 173. Accordingly, when the apparatus of the present invention is in the system display mode of operation, no manual intervention is required to display data from a remote location since the signal on bus 173 through the register 94 will cause the control 88 to select the appropriate position for the microfilm holder 90. The mechanical linkages which position the holder 90, of course, generate a coded representation of the set of conditions to be displayed which coded representation is used by the selection circuits 8 as previously described in connection with FIGS. 2(a) and 2(b).

With reference to FIGS. 7 and 8, the indicators 2 have been indicated as being incandescent or neon lamps being of a substantial length along a central access so that they are preferably mounted with that central access substantially parallel with the light leaving mirror 141 and impinging upon the screen 133. It is of course intended that other types of indicators may be employed in connection with the present invention. For example, electroluminescent devices or light emitting diodes (LED's) may equally well be employed as indicators.

While the indicators 2 may be employed without any additional circuitry, it is frequently desirable to employ indicator drivers (such as SCR's) which assure that the power requirements of the indicators are satisfied. Accordingly, the indicators 2 are intended to include any such driving circuits.

In order to increase the duration that each indicator is illuminated, each of the indicators 2 includes a latch which is turned on by a gate 117. In an alternate embodiment the latches for ROW 1 remain on if set by condition signals from bus 15 while ROW 2 through ROW 9 are scanned and are only reset when ROW 10 is scanned. In this alternate embodiment, the latch associated with each indicator lamp (or other indicator such as a light emitting diode) may be conventional with its set terminal connected to gate line 125 and its reset terminal for ROW 1 latches connected to output of ROW 10 decoder 131. Similarly, the ROW 2 latches remain on if set while ROW 3 through ROW 10 are scanned and are only reset when ROW 1 is scanned by the decoder 122.

With reference to FIG. 2(b), it is apparent that the ROW gate outputs 50 are all assigned a fixed set to which they correspond which in turn implies that any particular condition 40 of FIG. 2(a) will be associated with only a predefined set. Since it may be desirable to display a condition 40 which normally is displayed in one set, for example S1, in some other set such as S10, that formating flexibility may be achieved by the simple addition of switching in FIG. 2(b). For example, one manner of achieving that switching capability is to provide means for switching the ten inputs 58 to the ROW gates 53 for any one set with the corresponding inputs 58 for any other set. For example, if the inputs 58 to the AND gates A1 and A2 of S1 were interchanged with the corresponding AND's of S2 then the first and second rows of S1 would effectively be exchanged with the first and second rows of S2. This switching ability allowing ROWS of indicators to be shifted from one set to another may be implemented, of course, by manual connection or by electronic switching means.

Although the microfilm holder of FIG. 9 has been depicted as movable in both the horizontal and vertical directions, many equivalents are, of course, possible. For example, a strip film holder movable in only one direction as is commonly found in the microfilm viewer industry may be employed. The important point is that each microfilm is selectable by an image control means.

While the apparatus of the present invention is conveniently used in a simplex system, that is, one system with one display device, many other configurations are, of course, possible. For example, with reference to FIG. 11, a duplex system of operation is depicted where each system has its own display. Each of the systems taken separately is identical to the simplex system previously described in this specification. The two simplex systems are interconnected between the 24-bit multiplex busses 15–1 and 15–2 by the multiplex bus gate 184. Additionally the first and second systems of FIG. 11 are interconnected by various duplex controls. The gate circuitry 184 allows sets of condition signals appearing on either of the multiplex busses 15–1 or 15–2 to be gated through to the other multiplex bus. Gate 184 is controlled by either inputs 186–2 from system control 2 or 186–1 from system control 1. Gate circuitry 184 may be conventional AND's similar to those previously described in connection with the ROW gates of FIG. 2(b). Gate circuitry 184 may also include priority circuitry which, in a conventional manner, will decide as between competing signals on lines 186–1 and 186–2 which will, in fact, gain control. Since many priority schemes are well known in the prior art, no further detail is deemed warranted herein.

By way of example, it is assumed that the second system obtains control of gate 184 for the purpose of displaying on display 3–2 any desired set of conditions associated with the first system. The selection of the particular first system set of conditions to be displayed on display 3–2 is under control of system control 2 which specifies on its output 173–2 a four-bit binary code. The four-bit binary code on the output lines 173–2 connect to the selection circuits (not shown) of the first system which are identical to the circuits of FIG. 2(b). The 173–2 input is connected, with reference to FIG. 2(b), to the gate 175 at the 173 input. System control 2, when it has gained access of gate 184, establishes a pulse on the gate and inhibit line 32 of FIG. 2(b) thereby opening the gate 175 and allowing the second system circuitry to select a set in the first system. After selection of a particular set by system control 2, the demultiplex control 23–2 forces its oscillator, identical to the oscillator 103 of FIG. 5(a) to substitute for the oscillator in the demultiplex control 23–1 of the first system, again identical to oscillator 103 in FIG. 5(a). Although further details of the circuitry are not shown, the manner of implementation is identical to that of FIG. 3 in which inhibit and gating signals are employed to substitute the second high speed timing signal for the first timing signal of step line 25. The demultiplex control 2 controls demultiplex control 1 via the bus 187 and the connections previously described. Demultiplex control 1 in turn controls the multiplex control (not shown) for the first system which is identical to the multiplex control of FIG. 3. With the first system circuitry controlled in the manner described, the 240 condition signals of the selected set in the first system are time multiplexed in ten time frames over the bus 15–1, through the gate 184, to the multiplex bus 15–2, through the demultiplex gates 18–2 which demultiplexes the condition signals of the first system and displays them on the indicators in display 3–2.

While one form of duplex operation has been described where the first system has a set of conditions variations are possible. For example, the first system conditions may be selected by the second system, and transferred through the gate 184 into the system register 165–2 and out from register 165–2 to external points in the system over the out bus 172–2 and thereafter retrieved for display or other use at a later time.

The above indicated duplex operation is particularly convenient for the monitoring of one system by another system such as may be necessary for maintenance. For example, if the first system has developed errors in its operation such that it cannot effectively run, the second system may be programmed with error analysis routines which, by means of the selection, distribution and display apparatus of the present invention, to analyze the conditions of the first system. Conditions are conveniently displayed on display 3–2 or 3–1 or both. Since there are only a few interlinking control lines and one 24-bit bus between systems, the first and second systems may be conveniently located at remote locations. With that mode of operation, an operator at a remote location by means of his system circuitry which is known to be in good operating condition may troubleshoot the problems on a remote system which is malfunctioning.

While the apparatus of the present invention is primarily related to indicator display type systems, the selection and distribution apparatus of the present invention may of course be employed with a CRT or other displays. With other type displays, the demultiplex gates of FIG. 6 rather than connecting to indicators each connect to a buffer memory which is sequentially read out to a CRT display in a well known manner. Alternatively, the decoders 122 through 131 may be employed to control suitable analog circuitry for establishing vertical deflection levels avoiding the need for a buffer memory. If such a CRT display system is employed, suitable indicia generating circuitry is included in order to identify the particular set of conditions being displayed.

While indicator displays and CRT displays may be employed, the broad aspects of the present invention are not limited to any particular type of display. The present invention includes oscilloscopes where the operator wishes to scope the condition signals at many points throughout the system. In such an oscilloscope operation, the oscilloscope probes are connected at terminals 125 (see FIG. 6) and enable an operator to scope the condition signals associated with the respective indicators. Since scoping generally requires the continuous presence of the signals being scoped and since in the normal display mode of operation condition signals are time multiplexed and therefore are not continuously present, the oscillator 103 of FIG. 5(a) includes a manual override switch 114 which inhibits any output signal from oscillator 103. Additionally, the manual override 114 includes an incrementing switch which allows the counter 101 to be stepped a single count at a time, thereby enabling the operator to continuously observe any selected ROW of condition signals.

Although a display with 2400 input conditions has been described, the apparatus of the present invention is readily expandable to greater numbers of conditions without the need of adding additional indicators. For expansion, the number of sets, the number of optical images, and the number of multiplexing frames are increased.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data processing system having a plurality of system signal conditions representative of information relating to states of system components wherein said conditions are organized for display logging applications into a plurality of individually selectable sets of conditions and within each set into a plurality of individually selectable groups of conditions, the apparatus comprising:

control means for specifying one of said sets of signal conditions as a specified set to be selected;

selection means responsive to said control means for selecting said specified set of conditions and for gating out condition signals representative of said selected set;

a multiplex bus for receiving and distributing said gated out condition signals in groups corresponding to said individually selectable groups; and multiplex control means having variable timing for causing said selection means to gate onto said bus, in a time multiplexed cyclically repeated sequence of variable period, groups of said selected condition signals representative in aggregate of said specified set of conditions whereby signals on said bus having particular timings are organized for convenient alternate presentation to internal system circuits and a scanned illumination display composed of a set of grouped indication points.

2. The apparatus of claim 1 wherein said multiplex control means includes a first timing-signal input for controlling slow speed operation of said selection means and a second timing-signal input for controlling fast speed operation of said selection means.

3. The apparatus of claim 1 further including, a display including a plurality of indicators;

demultiplex means connected to said multiplex bus to energize said indicators with the condition signals gated from said multiplex bus.

4. The apparatus of claim 3 further including a demultiplex control means operative to generate a first timing-signal for synchronously controlling both said demultiplex gates and said multiplex gates.

5. A data processing system having a plurality of system signal conditions representative of information relating to system component states wherein said conditions are organized into a plurality of individually selectable sets of said conditions and wherein each set is organized into a plurality of individually selectable groups of conditions, the apparatus comprising:

a display including an optical projector having means for projecting over an optical path one of a plurality of condition-identifying optical images onto an optical screen and including a plurality of indicators positioned in the optical path adjacent the screen, said optical images including indicia for identifying the indicators;

image control means for selecting a first optical image to be projected onto the screen and for generating a control signal specifying a corresponding one of said sets of conditions as a specified set to be selected;

selection means responsive to said control signal for selecting said specified set of conditions and for gating out condition signals representative of said specified set of conditions; and connecting means connecting said selection means alternately to said system and said display indicators for energizing said indicators by said gated out condition signals, cyclically in time-multiplexed groups, so as to form a viewable display of the specified set of selected system conditions.

6. The apparatus of claim 5 wherein said connecting means further includes;

a multiplex bus connected to said selection means for receiving and distributing said condition signals; and multiplex control means for causing said selection means to gate onto said bus, a group at a time, the condition signals representative of the conditions of said specified set;

demultiplex means connecting said bus to said indicators, said demultiplexing means gating each group of condition signals to a different group of indicators.

7. The apparatus of claim 6 wherein said multiplex control means includes a first timing-signal input for controlling slow speed operation of said selection means and a second timing-signal input for controlling fast speed operation of said selection means.

8. The apparatus of claim 6 wherein each of said indicators includes a latch circuit operative to be set by respective condition signals on said multiplex bus so as to increase the period of illumination of said indicators.

9. The apparatus of claim 8 wherein said latch circuit includes an SCR settable during a positive half cycle period and which is automatically reset during a negative half cycle period so as to render said indicators conductive, when selected, approximately fifty percent of the time.

10. The apparatus of claim 6 wherein said demultiplex means further includes means for generating a slow speed, first timing-signal and wherein said multiplex control means includes a first input connected to receive said first timing-signal for controlling slow speed operation of said selection means in time-multiplex and includes a second input with inhibitory coupling to said first input for receiving timing signals produced externally of said connecting means to inhibit receipt of said first signals and to operate said selection means at a rate other than said slow speed.

11. A data processing system having a plurality of system conditions representative of information relating to the system wherein said conditions are organized into a plurality of individually selectable sets of said conditions and wherein each set contains a plurality of individually selectable groups of said conditions, the apparatus comprising:

control means for specifying one of said sets of conditions as a specified set to be selected;

selection means responsive to said control means for selecting said specified set of conditions and for gating condition signals representative of said conditions;

a multiplex bus for receiving and distributing said condition signals;

multiplex control means for causing said selection means to gate onto said bus, a group at a time, groups of condition signals representative of said specified set of conditions;

system circuitry means including a system register connected to said multiplex bus for distributing said condition signals throughout said system;

a display including a plurality of indicators; and demultiplex means connected to said multiplex bus to energize said indicators with the condition signals.

12. The apparatus of claim 11 wherein said demultiplex means further includes means for generating a slow speed, first timing-signal and wherein said multiplex control means includes a first input connected to receive said first timing-signal for controlling slow speed operation of said selection means in time-multiplex and includes a second input with inhibitory coupling to said first input for receiving timing signals produced externally of said connecting means to inhibit receipt of said first timing signals and to control operation of said selection means at a rate other than said slow speed.

13. A data processing system having a plurality of system conditions representative of information relating to the system wherein said conditions are organized into a plurality of individually selectable sets of said conditions and wherein each set contains a plurality of individually selectable groups of said conditions, the apparatus comprising:
control means for specifying one of said sets of conditions as a specified set to be selected;
a multiplex bus;
selection means responsive to said control means for selecting said specified set of conditions and for gating onto said bus condition signals representative of said conditions;
multiplex control means for causing said selection means to gate onto said bus, a group at a time, groups of condition signals representative of said specified set of conditions;
system circuitry means including a system register connected to said multiplex bus for distributing said condition signals throughout said system;
a display including a plurality of indicators;
demultiplex means connected to said multiplex bus for gating condition signals from said multiplex bus to said indicators;
demultiplex control means operative to control said demultiplex means with a first timing frequency and selectively operable to synchronously control said multiplex control means at said first timing frequency.

14. The apparatus of claim 13 further including an alternate control operative to selectively inhibit operation of said multiplex control means at said first timing frequency and to cause said multiplex control means to operate at a second timing frequency to gate condition signals from said bus to said system register.

15. The apparatus of claim 13 wherein said display includes an optical projector having means for projecting over an optical path one image of a plurality of condition-identifying optical images onto an optical screen, said one image locally impinging upon said screen at a plurality of local angles, and wherein said indicators exhibit a length substantially longer than their width, are positioned in the optical path adjacent the screen, and form a local angle with said screen substantially equal to the local angle formed by said one image.

16. Data processing systems having a plurality of signal conditions representative of information relating to component states in first and second systems wherein said conditions of each said system are organized into a plurality of individually selectable sets of said conditions and wherein each set contains a plurality of individually selectable groups of said conditions, the apparatus comprising:
control means for specifying one of said sets of conditions as a specified set to be selected;
first and second multiplex busses interconnected by a gate for cross transfer of groups of said signal condition between said systems;
first and second selection means responsive to said control means for selecting specified said sets of conditions and for gating out to said busses condition signals representative of said sets;
first and second multiplex control means for causing said first selection means to gate onto respective said busses, in time-multiplex, groups of condition signals representative of said specified sets of conditions;
a display including a plurality of groups of indicators;
demultiplex means connected to said multiplex busses for gating condition signals in groups from one of said busses to each of said groups of display indicators; and
first and second demultiplex control means associated with respective said busses operative to synchronously control said demultiplex means, said second demultiplex control means being operative to control said first demultiplex control means.

17. In a data processing system including a main signal distribution system, a plurality of sets of condition manifesting components, and a plurality of sets of lines for transferring condition signals representative of states of said components, auxiliary signal distribution apparatus comprising:
a scanned illumination display composed of a set of illuminatable indicating points; and
multiplex connection means for interconnecting a selected set of said lines with said display by scanning sub-sets of said selected set of lines in time multiplex while synchronously distributing signals received from said scanned sub-sets to respective sub-sets of said display point indicating set.

18. Apparatus according to claim 17 including system return connection means for establishing return connections from said multiplex connection means into said main signal distribution system.

19. An apparatus according to claim 18 including system display connection means for selectively establishing time-multiplexed connections from said main distribution system to said multiplex connection means while inhibiting said line connections, for developing thereby display indications representative of information other than instantaneous conditions of said components.

References Cited

UNITED STATES PATENTS

| 3,332,071 | 7/1967 | Goldman et al. | 340—172.5 |
| 3,387,084 | 6/1968 | Hine et al. | 178—6.8 |
| 3,439,340 | 4/1969 | Gallagher | 240—172.5 |

PAUL J. HENON, Primary Examiner

S. R. CHIRLIN, Assistant Examiner